Aug. 24, 1965 J. BRANDWOOD ETAL 3,202,404
FLOW CONTROL DEVICES IN A CARBURETOR
Filed Jan. 2, 1962
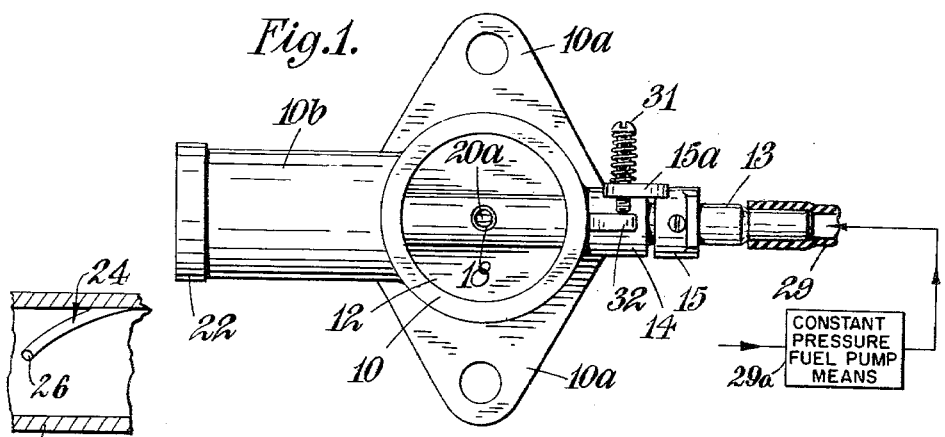
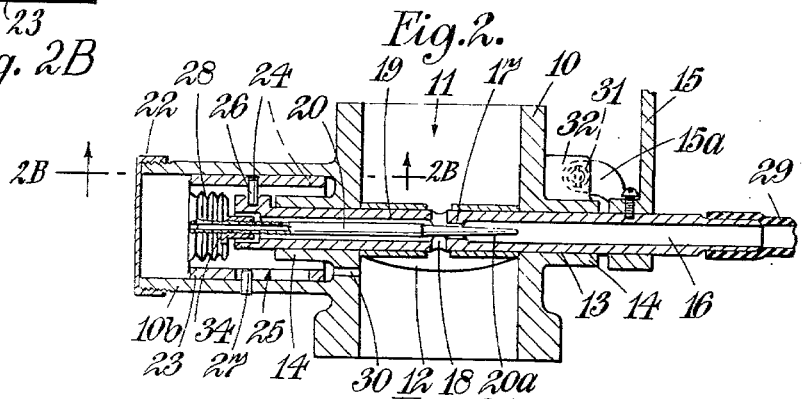
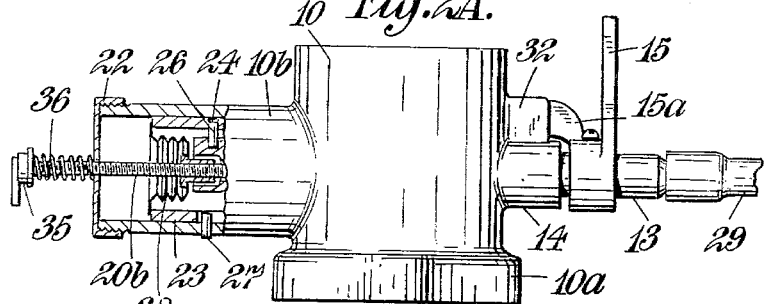
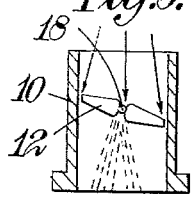
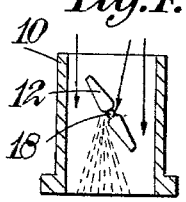
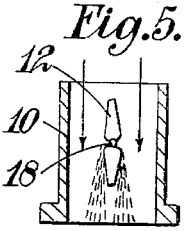
INVENTORS
Joseph Brandwood
Grace Brandwood
By Watson, Cole, Grindle & Watson
ATTORNEYS 3,202,404
FLOW CONTROL DEVICES IN A
CARBURETOR
Joseph Brandwood and Grace Brandwood, both of
42 Upper North St., Brighton 1, Sussex, England
Filed Jan. 2, 1962, Ser. No. 163,633
Claims priority, application Great Britain, Jan. 2, 1961,
1/61
1 Claim. (Cl. 261—39)

This invention is for improvements in or relating to flow control devices.

According to this invention, a flow control device comprises a duct containing a disc valve which is adjustable to vary the duct flow area by being carried on a rotatively mounted spindle, the spindle having a longitudinal bore through which fluid flows to a port connecting the bore to the duct, a valve member controlling fluid flow along the bore to the port, the valve member being coupled to the spindle to be adjusted in dependence upon the adjustment of the disc valve.

The device of this invention may be employed for delivering a metered quantity of a fluid into a controlled stream of another fluid flowing through the duct, and in one important application, the device is adapted as a fuel injection for delivering a metered quantity of a liquid fuel injection device for delivering a metered quantity of a liquid fuel into a controlled air stream flowing towards a cylinder, or cylinders, of an internal combustion engine.

The device is of a simple construction, so facilitating manufacture, and the coupling between the valve member and the disc valve may readily be constructed to allow adjustment of the valve member in dependence upon operating parameters additional to the setting of the disc valve in the duct.

Preferably, the disc valve is a butterfly valve, the spindle bisecting it, the butterfly valve having a central cross-bore into which the longitudinal bore opens, the cross-bore constituting the port connecting the longitudinal bore to the duct, whereby fluid may flow from upstream to downstream of the butterfly valve through the cross-bore and entrain fluid flowing from the longitudinal bore. This has advantage when injecting a liquid into a flow of a gas in the duct in that the liquid is atomised for all settings of the butterfly valve and is injected into the core of the main gas stream.

According to a feature of this invention, the valve member is a longitudinally-movable needle valve cooperating with a valve orifice in the longitudinal bore of the spindle to vary the orifice area and means coupling the needle valve to the spindle to effect longitudinal adjustment of the needle valve as the spindle is rotated. In preferred arrangements according to this feature of the invention, the means coupling the needle valve to the spindle is adapted to permit additional adjustment of the needle valve in accordance with an operating parameter, for instance ambient temperature or ambient atmospheric pressure or pressure in the duct downstream of the disc valve, and also adjustment for initial setting purposes. One particular construction allowing such adjustments is described hereinafter.

When the device is employed as a fuel injection device for an internal combustion engine, the liquid fuel is preferably fed to the spindle from pumping means adapted to deliver at constant pressure.

One preferred embodiment of flow control device incorporating the above and other features of invention will now be described with reference to the accompanying drawings in which:

FIGURE 1 is a plan view of the device,

FIGURE 2 is a sectional elevation of the device,

FIGURE 2A shows a modification,

FIGURE 2B is an enlarged fragmentary elevation view of the control sleeve as seen on the line 2B—2B of FIGURE 2 looking in the direction of the arrows, the surrounding chamber 10b being broken away, and FIGURES 3 to 5 are diagrams illustrating the operation of the device.

The flow control device illustrated is adapted for use in connection with internal combustion engines to control air flow to the engine and to inject metered quantities of fuel into air flowing towards the engine. The device may be connected to the intake manifold so as to serve a number of cylinders, or several such devices may be provided one for each cylinder of the engine.

The device (FIGURES 1 and 2) comprises a body 10 defining an air flow duct 11 and having bolting flanges 10a by which it is mounted in position on an engine. The air flow in the duct is controlled by a butterfly valve 12 carried on a bisecting spindle 13 extending transversely of the duct 11 and rotatively mounted in bearing necks 14 at each side of the body 10. The spindle is rocked to vary the position of the butterfly valve by means of throttle lever 15.

The spindle 13 is formed with a bore part 16 of which extends from one end of the spindle to an orifice 17 opening into a cross-bore 18 which constitutes an outlet port for the fluid flowing from orifice 17 and which leads from one surface to the other of the butterfly valve 12 at the centre of the duct 11. A further part 19 of the bore extends from the other end of the spindle 13 to the cross-bore 18 and accommodates a needle valve 20, the shaped tip 20a of which projects through the orifice 17. The needle valve 20 moves lengthwise of the bore 19.

The outer end of the needle valve 20 projects into a cylindrical chamber formed in a lateral extension 10b of the body, the outer end of the extension 10b being closed by a removable cap 22. The chamber slidingly accommodates a control sleeve 23 having a helical groove 24 and a longitudinal groove 25. A pin 26 projects from the adjacent end of the spindle 13 into the groove 24 and a pin 27 projects from the extension 10b into groove 25; thus on rotation of the spindle 13 by lever 15, the sleeve is moved axially of itself within the chamber.

A bellows 28 connects adjacent ends of the sleeve 23 and the needle valve 20 so that the valve 20 moves with the sleeve 23, and thus the area of the orifice 18 is varied in accordance with the setting of the butterfly valve. It is arranged that as the butterfly valve is opened from the position of FIGURE 3 through the position of FIGURE 4 to the position of FIGURE 5 the area of orifice 17 is gradually increased so allowing a gradually increasing quantity of fuel to pass into the cross-bore 18. The fuel supply may be effected through a suitable length of flexible tubing 29 from a constant pressure supply 29a (shown diagrammatically in FIGURE 1) formed for example by an engine driven pump fitted with a pressure relief valve. A supply pressure of from 3 to 10 p.s.i.g. is suitable for internal combustion engines.

The inner end of the chamber within the extension 10b is connected by a port 30 to the duct 11 on the downstream side of the butterfly valve 12 and thus the bellows 28 changes in length with changes in the engine manifold pressure. As this pressure decreases so the bellows 28 expands cutting down the area of orifice 17 and the fuel supply. The bellows 28 also expands and contracts with increase and decrease of ambient temperature, so that the fuel supply is cut down on increase of ambient temperature and is increased on decrease of ambient temperature.

The operation is illustrated in FIGURES 3 to 5. For starting or idling the butterfly valve 12 is substantially closed (FIGURE 3), and on cranking the engine air flows at high velocity through the cross-bore 18 atomising the fuel flowing through the orifice 17 to produce a rich mixture which is diluted by any air flowing round the edges of the butterfly valve 12. The fuel being injected into the core of the air flow is little affected by boundary layer conditions.

As the butterfly valve 12 is part opened (FIGURE 4), the fuel supply correspondingly increases. Air still flows through the cross-bore 16 atomising the fuel, and any fuel which streams down the butterfly valve 12 to its downstream edge is atomised by the air flow past the valve.

At full throttle (FIGURE 5) the butterfly valve 12 is parallel to the air flow and the cross-bore 18 is normal to the air flow. Fuel emerges at each end of the bore 18 where it is atomised by a shear action of the air flow. Any fuel streaming along the butterfly valve 12 is blown off the downstream edge into the core of the air flow.

The starting or idling setting of the butterfly valve 12 may be adjusted as shown in FIGURE 1 by means of a set screw 31, mounted in a lug 15a on the lever 15 and bearing against a stop 32 on the body 10. The initial setting of the needle valve 20 may be effected as shown in FIGURES 2 and 2A by providing a thread on the valve to engage an internally threaded boss 34 on the bellows 28, the valve 20 either having a slot in its end to be engaged by a screw driver (FIGURE 2), or having (FIGURE 2A) an extension 20b outside the cap 22 to carry a manipulating knob 35. A spring 36 may be provided on the valve between the knob 35 and cap 22.

The fuel injection device has many advantages. For instance it is compact and is simple and cheap to manufacture in that the only external working part is the throttle lever 15, the only external pipe is the fuel feed pipe 29, there is no venturi, the only air flow obstruction is the butterfly valve 12 which may be streamlined, and there is no float or float chamber. Further, the device is simple to adjust and to calibrate and avoids the need to provide a choke for cold starting or an acceleration pump so that the installation in a motor vehicle is simplified. In operation, good atomisation of the fuel is obtained at all settings of the butterfly valve and the fuel is delivered to the core of the air flow. Also there is no appreciable g effect.

We claim:

A flow control device for use with an internal combustion engine comprising a body having an air flow duct extending therethrough; a disc valve within the duct, a spindle rotatively mounted in said body and supporting the disc valve within the air flow duct, the spindle bisecting the disc valve, a lever secured to the spindle and operable to rotate said spindle and to adjust the disc valve between a first position substantially obstructing air flow through the duct and a second position in which the air flow is substantially unobstructed by the disc valve, there being a cross-bore extending between the surfaces of the disc valve and opening into the air duct through said surfaces at the center thereof, and said crossbore further intersecting the spindle, said spindle having a first bore part extending therethrough from one end thereof to adjacent said cross-bore, said one end of the spindle being adapted for connection to a pressure fuel source, a flow control orifice connecting and opening directly into said crossbore and into said first bore part, said spindle further having a second bore part extending therethrough from the other end thereof to said crossbore, a needle valve longitudinally movable in said second bore part, said needle valve having at its one end a shaped tip projecting through said orifice, said shaped tip increasing the effective flow area of the orifice on longitudinal movement of the needle valve in one direction in the second bore part and decreasing said effective flow area on movement of the needle valve in the opposite direction thereby determining the flow of fuel from the first bore part through the orifice into said cross-bore, a mechanical connection means converting angular movement to linear movement and interconnecting said spindle and said needle valve and displacing said needle valve longitudinally in said one direction in said second bore part by rotation of said spindle to adjust the disc valve from its first position to its second position, a lateral extension of the body defining a chamber into which projects said other end of the spindle and the end of the needle valve remote from its shaped tip, said mechanical connection means comprising a control sleeve mounted in said chamber for longitudinal sliding movement, there being a helical slot in said sleeve, a pin on said spindle and engaging said helical slot, a bellows connecting said control sleeve and said other end of said needle valve, said bellows forming a flexible wall of a pressure space in said chamber, and a pressure connection from said air flow duct on the downstream side of said disc valve to said pressure space.

References Cited by the Examiner

UNITED STATES PATENTS

| | | | |
|---|---|---|---|
| 1,134,047 | 3/15 | Hunter | 74—57 |
| 1,178,960 | 4/16 | Smith. | |
| 1,520,926 | 12/24 | Brown. | |
| 1,839,102 | 12/31 | Kessel | 261—44 |
| 1,951,262 | 3/34 | Townsley | 261—44 |
| 2,102,476 | 12/37 | Mennesson. | |
| 2,574,670 | 11/51 | Sweeney | 261—37 |
| 2,630,304 | 3/53 | Rivoche | 261—44 |
| 2,710,604 | 6/55 | Snyder. | |
| 2,801,086 | 7/57 | Fish | 261—44 |
| 2,926,007 | 2/60 | Pettit | 261—44 |

FOREIGN PATENTS 72,268   3/51   Denmark.

HARRY B. THORNTON, *Primary Examiner.*

HERBERT L. MARTIN, *Examiner.*